(12) United States Patent
Seurat

(10) Patent No.: US 11,156,533 B2
(45) Date of Patent: Oct. 26, 2021

(54) SYSTEM FOR TESTING A PERFUME

(71) Applicant: LOUIS VUITTON MALLETIER, Paris (FR)

(72) Inventor: Aurélie Seurat, Levallois-Perret (FR)

(73) Assignee: LOUIS VUITTON MALLETIER, Paris (FR)

( * ) Notice: Subject to any disclaimer, the term of this patent is extended or adjusted under 35 U.S.C. 154(b) by 55 days.

(21) Appl. No.: 16/307,583

(22) PCT Filed: Jun. 6, 2017

(86) PCT No.: PCT/FR2017/051431
§ 371 (c)(1),
(2) Date: Dec. 6, 2018

(87) PCT Pub. No.: WO2017/212170
PCT Pub. Date: Dec. 14, 2017

(65) Prior Publication Data
US 2019/0257721 A1    Aug. 22, 2019

(30) Foreign Application Priority Data
Jun. 7, 2016  (FR) ...................................... 1655214

(51) Int. Cl.
*B05B 12/02* (2006.01)
*B05B 12/12* (2006.01)
*G01N 1/14* (2006.01)

(52) U.S. Cl.
CPC ............... *G01N 1/14* (2013.01); *B05B 12/02* (2013.01); *B05B 12/122* (2013.01)

(58) Field of Classification Search
CPC ............... B05B 11/3056; B05B 12/122; B05B 11/3059; B05B 12/02; B05B 11/3061;
(Continued)

(56) References Cited

U.S. PATENT DOCUMENTS 3,756,427 A * 9/1973 Arnemann ............. B65G 57/06
414/793.4
4,380,967 A * 4/1983 Matt ..................... B65B 51/023
118/669
(Continued)

FOREIGN PATENT DOCUMENTS

DE    19938405 A1    2/2001
EP    1103309 A1    5/2001
(Continued)

OTHER PUBLICATIONS

Machine Translation of FR-2935359 Which Originally Published on Mar. 5, 2010. (Year: 2010).*
(Continued)

*Primary Examiner* — David A. Rogers
(74) *Attorney, Agent, or Firm* — von Briesen & Roper, s.c.

(57) ABSTRACT

The invention relates to a system for testing a perfume, comprising a housing, a test member able to be at least partially inserted into the housing so as to be impregnated with the perfume, a dispensing device for dispensing the perfume on the test member, a sensor for detecting the presence of the test member, an actuator for actuating the dispensing device, and a processing unit which controls the actuator in order to trigger the dispensing during extraction of the test member.

10 Claims, 3 Drawing Sheets

(58) Field of Classification Search
CPC ..... B05B 11/3052; B05B 12/32; B05B 15/60; B05B 9/043

See application file for complete search history.

(56) References Cited

U.S. PATENT DOCUMENTS

| | | | | |
|---|---|---|---|---|
| 4,408,562 A * | 10/1983 | DeCamp | ............... | B05C 5/02 118/324 |
| 4,500,937 A * | 2/1985 | Matt | ............... | H01F 7/18 118/682 |
| 4,759,652 A * | 7/1988 | Ulrich | ............... | A45D 34/00 15/222 |
| 4,980,996 A * | 1/1991 | Klink | ............... | B24B 29/08 29/888.06 |
| 5,249,718 A * | 10/1993 | Muderlak | ............... | G04C 23/38 222/1 |
| 5,258,073 A * | 11/1993 | Meier | ............... | B05B 12/32 118/301 |
| 5,611,995 A * | 3/1997 | de Zoeten | ............... | B01L 3/5023 422/412 |
| 5,683,752 A * | 11/1997 | Popp | ............... | A61F 13/15699 427/8 |
| 5,711,989 A * | 1/1998 | Ciardella | ............... | B05C 5/0225 427/8 |
| 5,829,642 A * | 11/1998 | Momboisse | ............... | B05B 11/3056 222/162 |
| 6,036,108 A * | 3/2000 | Chen | ............... | B65D 83/262 222/402.13 |
| 6,267,297 B1 * | 7/2001 | Contadini | ............... | A61L 9/12 222/646 |
| 6,405,906 B1 * | 6/2002 | de Laforcade | ............... | B05B 11/3056 222/153.13 |
| 6,786,106 B2 * | 9/2004 | Alley | ............... | B01L 3/502 73/864.51 |
| 6,969,008 B2 * | 11/2005 | Helf | ............... | A47F 7/286 239/4 |
| 7,083,823 B2 * | 8/2006 | Estelle | ............... | B05C 11/1021 222/639 |
| 7,424,961 B2 * | 9/2008 | Grenier | ............... | A45D 34/02 222/181.3 |
| 7,798,424 B2 * | 9/2010 | Lin | ............... | A61L 9/14 239/305 |
| 8,061,562 B2 * | 11/2011 | Carpenter | ............... | B05B 12/12 222/52 |
| 8,573,443 B2 * | 11/2013 | Natterer | ............... | B05B 12/122 222/52 |
| 8,632,731 B2 * | 1/2014 | Simmons | ............... | G01N 33/48785 422/404 |
| 8,844,766 B2 * | 9/2014 | Zaima | ............... | B05B 11/308 222/52 |
| 8,911,941 B2 * | 12/2014 | Michlitsch | ............... | C12Q 1/6846 435/6.1 |
| 9,044,522 B2 * | 6/2015 | Gasper | ............... | A61L 9/125 |
| 9,386,902 B2 * | 7/2016 | Alpert | ............... | A47L 15/0002 |
| D826,712 S * | 8/2018 | Servaire | ............... | D9/432 |
| 10,219,656 B2 * | 3/2019 | Pelfrey | ............... | A47K 5/1215 |
| 10,464,088 B2 * | 11/2019 | Knight | ............... | B05B 11/3061 |
| 10,779,663 B2 * | 9/2020 | Hagiage | ............... | B65H 3/06 |
| 2002/0020717 A1 | 2/2002 | De Laforcade | | |
| 2003/0004089 A1 * | 1/2003 | Huber | ............... | A45D 40/0087 512/1 |
| 2006/0081727 A1 * | 4/2006 | Stepaniak | ............... | B05C 5/027 239/592 |
| 2007/0138210 A1 * | 6/2007 | Grenier | ............... | A45D 34/02 222/321.8 |
| 2007/0166185 A1 * | 7/2007 | Bartels | ............... | A61L 9/14 422/5 |
| 2008/0048388 A1 * | 2/2008 | Gauss | ............... | B41J 3/407 271/227 |
| 2008/0050496 A1 * | 2/2008 | Boldor | ............... | B01F 5/0476 426/569 |
| 2010/0012163 A1 * | 1/2010 | Alpert | ............... | A47L 15/507 134/58 D |
| 2010/0237108 A1 * | 9/2010 | Anderson | ............... | B65D 83/262 222/646 |
| 2011/0095044 A1 * | 4/2011 | Sipinski | ............... | A61L 9/14 222/1 |
| 2013/0068786 A1 * | 3/2013 | Gasper | ............... | A61L 9/125 222/52 |
| 2013/0175291 A1 * | 7/2013 | Wegelin | ............... | A47K 5/1207 222/23 |
| 2013/0292407 A1 * | 11/2013 | Beavis | ............... | B67D 1/0036 222/1 |
| 2014/0144945 A1 * | 5/2014 | Jung | ............... | B05B 11/00416 222/320 |
| 2014/0319238 A1 * | 10/2014 | Su | ............... | A45D 34/00 239/70 |
| 2016/0052007 A1 * | 2/2016 | Fuller | ............... | B05B 11/3084 222/1 |
| 2016/0309967 A1 * | 10/2016 | Pelfrey | ............... | G05D 7/0676 |
| 2016/0340108 A1 * | 11/2016 | Carpenter | ............... | B05B 12/122 |
| 2017/0027189 A1 * | 2/2017 | Graczyk | ............... | F25D 29/003 |
| 2017/0098057 A1 * | 4/2017 | Poutiatine | ............... | H04B 5/0062 |
| 2017/0188759 A1 * | 7/2017 | Borke | ............... | A47K 10/3618 |
| 2017/0224085 A1 | 8/2017 | Dupont et al. | | |
| 2018/0116428 A1 * | 5/2018 | Hagiage | ............... | B65H 1/12 |
| 2018/0133502 A1 * | 5/2018 | Rajaiah | ............... | A61N 5/062 |
| 2020/0055311 A1 * | 2/2020 | Watanabe | ............... | B05B 12/122 |

FOREIGN PATENT DOCUMENTS

| | | | | |
|---|---|---|---|---|
| EP | 1172305 A1 | 1/2002 | | |
| FR | 2811299 A1 | 1/2002 | | |
| FR | 2890952 A1 * | 3/2007 | | |
| FR | 2935359 A1 * | 3/2010 | | |
| FR | 2987761 A1 | 9/2013 | | |
| WO | WO-9304622 A1 * | 3/1993 | ............ | A47K 10/32 |
| WO | WO-2013186145 A1 * | 12/2013 | | |
| WO | WO 2016020605 A1 | 2/2016 | | |

OTHER PUBLICATIONS

Machine Translation of DE-19938405 Which Originally Published on Feb. 22, 2001. (Year: 2001).*

Machine Translation of EP-1103309 Which Originally Published on May 30, 2001. (Year: 2001).*

Machine Translation of FR-2987761 Which Originally Published on Nov. 21, 2014. (Year: 2014).*

"Cerámica Porosa", Arcola Cerámicas, available on the internet at <https://web.archive.org/web/20140924084029/http://ceramicasarcola.com/ceramica-perfumada/>, Sep. 24, 2014. (Year: 2014).*

Machine Translation of Cerámica Porosa Which Originally Published on Sep. 24, 2014. (Year: 2014).*

International Search Report related to Application No. PCT/FR2017/051431; dated May 10, 2017.

French Search Report Application No. FR 16 55214; dated Feb. 21, 2017.

* cited by examiner

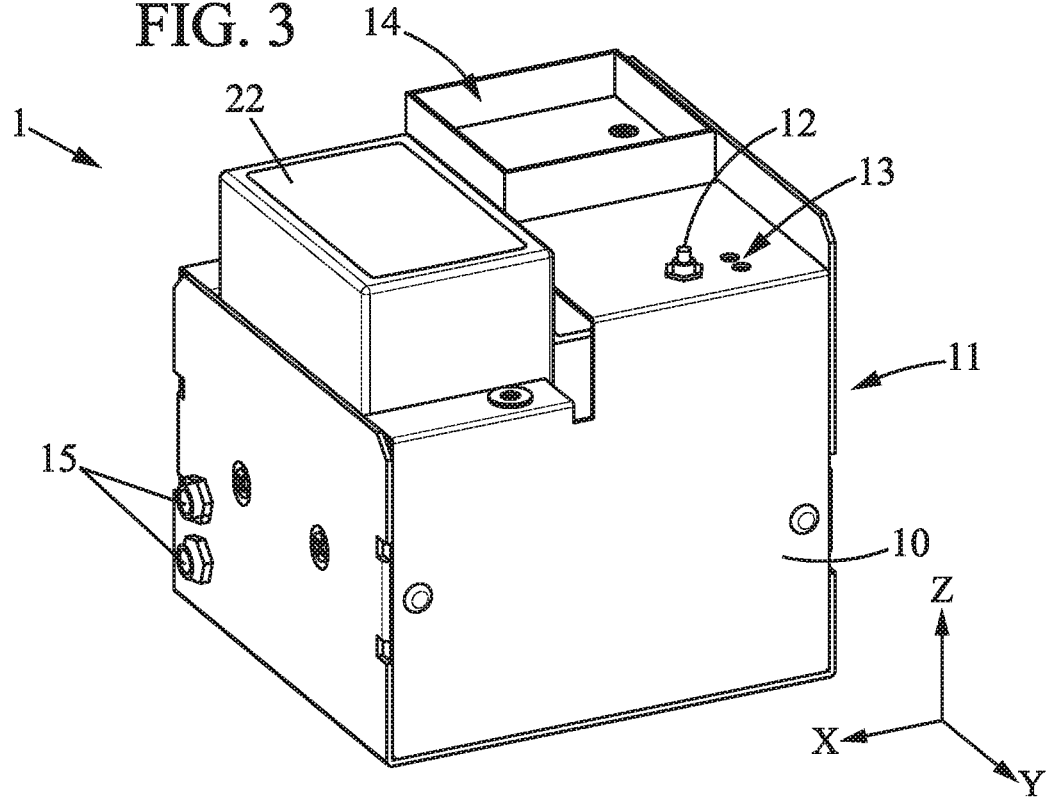
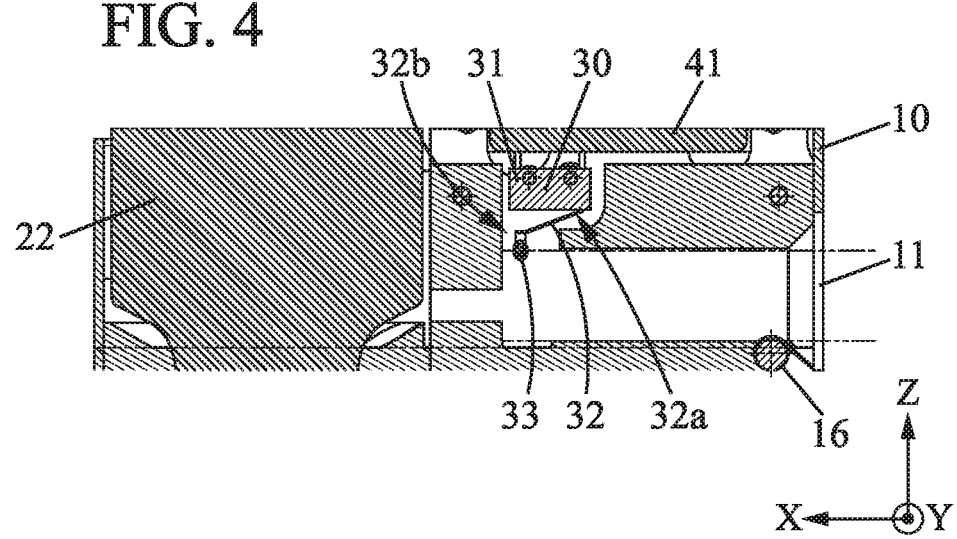

SYSTEM FOR TESTING A PERFUME

CROSS-REFERENCE TO RELATED APPLICATION

This Application is a 35 USC § 371 US National Stage filing of International Application No. PCT/FR2017/051431 filed on Jun. 6, 2017, and claims priority under the Paris Convention to French Patent Application No. 16 55214 filed on Jun. 7, 2016.

FIELD OF THE DISCLOSURE

The present invention relates to systems for testing perfumes.

More particularly, the invention relates to a system for testing a perfume, comprising:
a housing comprising an opening,
a test member able to be at least partially inserted into the housing through the opening, the test member being at least partially made of a material able to be impregnated with perfume,
a dispensing device arranged inside the housing and able to dispense the perfume onto the test member, said dispensing device being connected to a container containing the perfume,
a sensor which provides a signal suitable for detecting the presence or non-presence of the test member in the housing,
an actuator arranged inside the housing and able to actuate the dispensing device, and
a processing unit which receives the signal from the sensor and which controls the actuator to cause perfume to be dispensed onto the test member.

BACKGROUND OF THE DISCLOSURE

Document FR 2,987,761 describes an example of such a system for testing a perfume. However, this system uses a test member of paper or paperboard, and does not control the moment when perfume is dispensed onto the test member. The system does not allow completely experiencing the perfume, and in particular it does not allow correctly obtaining the base, heart, and top notes of the perfume.

SUMMARY OF THE DISCLOSURE

The present invention aims to provide an improved system for testing a perfume.

To this end, the invention proposes a system for testing a perfume of the aforementioned type, characterized in that:
the material of the test member is hard and porous, and
the processing unit controls the actuator at a spraying time determined relative to a detection time corresponding to the detection of the disappearance of the test member.

With these arrangements, the system for testing a perfume according to the invention dispenses perfume on a test member composed of an appropriately hard and porous material, and dispenses the perfume in a highly controlled manner during extraction of the test member from the housing of the system, in other words slightly before it is experienced by the user.

In various embodiments of the system for testing a perfume according to the invention, use may be made of one or more of the following arrangements.

In one aspect, the processing unit controls the actuator to cause said dispensing of perfume onto the test member, only if a prevention period measured between a previous spraying time and a present time exceeds a first time limit, in order to avoid saturating the test member with a large amount of perfume.

In one aspect, the first time limit is equal to 60 minutes.

In one aspect, the processing unit automatically controls the actuator in the absence of detecting the disappearance of the test member, if the presence of the test member is detected in the housing during a regeneration period measured between a previous spraying time and a present time is greater than a second time limit, in order to maintain a minimum amount of perfume on the test member.

In one aspect, the second time limit is equal to 180 minutes.

In one aspect, the system further comprises a means for detecting the loading of the container, and the processing unit controls the actuator one or more times in order to prime the dispensing device upon detecting said loading of the container.

In one aspect, the system further comprises a priming button, and the processing unit controls the actuator one or more times in order to prime the dispensing device upon detecting the actuation of said priming button by a user.

In one aspect, the actuator comprises a controllable motor suitable for varying the amount of perfume dispensed by the dispensing device onto the test member.

In one aspect, the system further comprises an absorbent pad arranged inside the housing and close to the opening, said absorbent pad being suitable for wiping at least a portion of the test member during extraction of said test member.

In one aspect, the absorbent pad is positioned in a lower portion of the opening.

In one aspect, the test member has, in a longitudinal direction, a first portion suitable for being impregnated with perfume and a second portion suitable for manipulating said test member, and the first portion has a predetermined length such that, when the test member is in an inserted position where the sensor detects the presence of the test member, the first portion does not protrude outside the housing.

BRIEF DESCRIPTION OF DRAWINGS

Other features and advantages of the invention will be apparent from the following description of at least one of its embodiments, given as a non-limiting example, with respect to the attached drawings.

In the drawings:

FIG. 3 is a perspective view showing the rear face of the system of FIG. 1;

FIG. 4 is a partial sectional view of the system along line IV-IV of FIG. 2, showing the internal sectional view of the opening with the sensor which detects the inserted test member;

In the different figures, the same reference numbers denote identical or similar elements.

DETAILED DESCRIPTION OF THE DISCLOSURE

Figure 1:
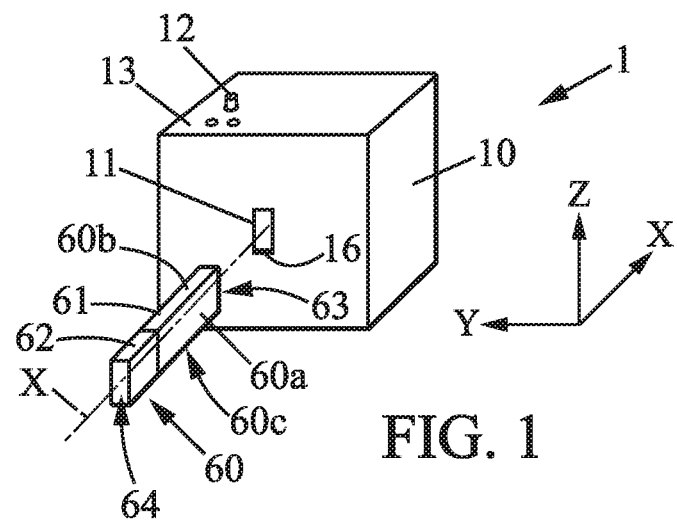
FIG. 1 is a schematic perspective view of a system for testing a perfume, with its test member.

FIG. 1 is a general illustration of a system for testing a perfume 1 according to the invention.

The system for testing a perfume 1 firstly comprises:
a housing 10 having an opening 11,
a test member 60 able to be at least partially inserted into the housing through the opening 11.

The housing 10 is for example in the form of a cube, but it may have any shape. It may be made of a material such as plastic, metal, glass, wood, etc.

The opening 11 is for example provided on a face of the housing, said face being a side face (in a substantially vertical plane) or an upper face (in a substantially horizontal plane). The opening 11 has for example a rectangular shape, or for example a square, cylindrical, triangular, or any other shape.

The test member 60 is a rigid member which extends in a longitudinal direction X for at least partial insertion into the housing 10.

This test member 60 has a cross-section, perpendicular to the longitudinal direction X, which is preferably complementary to the shape of the opening 11, so that the test member 60 can be inserted into the opening 11 and without leaving too large of a gap between the opening and the test member, for aesthetic reasons.

The test member 60 of the system according to the invention is formed at least partially from a material able to be impregnated with perfume in the liquid or gaseous state, for example a hard, porous material. This material is for example a porous ceramic. Alternatively, this material is a porous plastic, such as Porex™. These hard and porous materials allow repeated impregnation or spraying (not one-time use), which avoids unnecessarily discarding the test members. Moreover, these hard, rigid, and porous materials are well-suited for sensing the perfume, and in particular for perceiving all the base, heart, and top notes. In addition, the spraying can be periodically repeated without altering the experience. Plus, this material is durable and the possible number of sprays is very high, unlike paper or paperboard test members which are for one-time use.

The term "hard material" is understood to mean a material such that the user cannot visibly deform the test member 60. It is therefore a material with a high surface hardness. Such materials are generally very rigid, meaning that they have a high general rigidity.

The term "porous material" is understood to mean a material that comprises cavities or pores capable of being filled with a fluid. These pores have for example a size of between 10 μm and 200 μm. Advantageously, these pores are sized so that they are difficult for the user to see, in order to provide a continuous and aesthetic appearance to the user.

The test member 60 comprises for example in the longitudinal direction X:
a first portion 61 which extends to an insertion end 63, and
a second portion 62 which extends away from the insertion end 63 to a gripping end 64, said second portion thus being suitable for a user to manipulate said test member 60 with his or her hand.

Thus, the user can insert the test member 60 through the opening 11 to an inserted position, so that at least a portion of the first portion 61 is able to be impregnated with perfume inside the housing 10, in particular during extraction of the test member 60. After removing the test member 60 from the housing 10, the user can smell the perfume impregnating the first portion 61 of the test member 60.

The first portion 61 has, for example, a length determined so that when the test member is in the inserted position, the first portion 61 does not project out of the housing and only the second portion 62 is visible from outside the housing. The system is thus more aesthetic.

Figure 2:
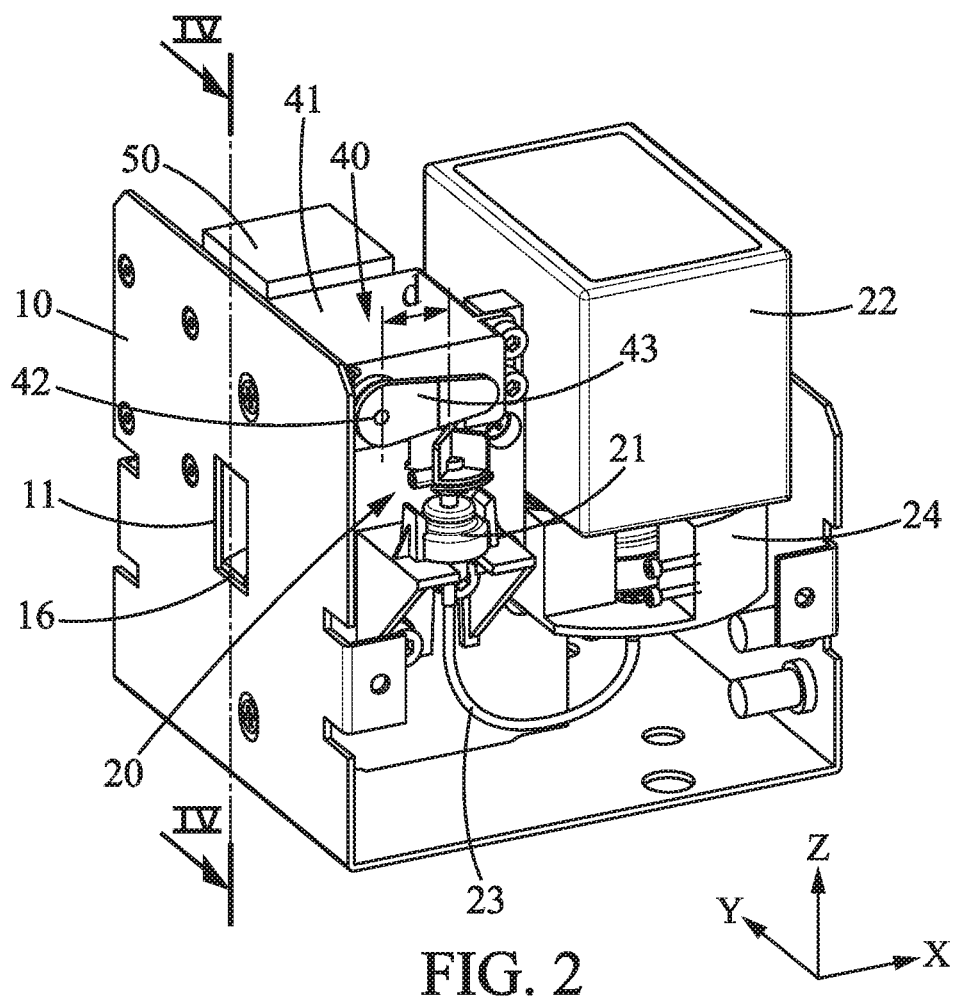
FIG. 2 is a perspective view showing the front face and the interior of the system of FIG. 1.

As shown in the internal view of FIG. 2 and the sectional view of FIG. 4, the system for testing a perfume 1 further comprises:
a perfume dispensing device 20 arranged within the housing and able to dispense a perfume onto the test member 60 when the latter is in the inserted position or is between the inserted position and a withdrawn position, positions in which the test member 60 is facing the dispensing device 20, at a predetermined distance, in order to receive the perfume (in particular the dispensing device can dispense the perfume during extraction of the test member 60, meaning between said inserted and withdrawn positions),
a sensor 30 which provides a signal suitable for detecting the presence or non-presence of the test member in the opening 11, more specifically for detecting the presence or non-presence of the test member 60 in the inserted position inside the housing 10,
an actuator 40 arranged inside the housing and able to actuate the dispensing device so that the perfume is dispensed (sprayed) onto the test member 60, and
a processing unit 50 which receives the signal from the sensor 30 and which controls the actuator 40.

The dispensing device 20 is for example composed of a pump 21 connected to a perfume container 22 by a dip tube 23.

The container 22 contains the perfume. This container is preferably located inside the housing 10 but may be located outside the housing 10, in which case the dip tube 23 exits the housing in order to be connected to the container (not shown).

The represented dispensing device 20 can spray, in a horizontal direction, a quantity of perfume onto a side face 60a of the test member 60. Alternatively, the dispensing device 20 could be oriented to spray perfume in a vertical direction onto an upper face 60b or lower face 60c of the test member 60, or to spray the perfume in any other direction suitable for the shape of the test member 60.

Advantageously, the dispensing device 20 sprays a quantity of perfume perpendicularly to a face of the test member 60 which receives said perfume, in order to prevent losing a portion of this quantity.

The sensor 30 may be a mechanical, optical, magnetic, or other type of sensor.

In the embodiment shown, the sensor 30 is mechanical and it comprises a body 31, a lever 32 which extends outside the body 31 and which is hinged to rotate at a first end 32a inside the body 31 and which is provided with a stop 33 at a second free end 32b outside of the body. When the stop 33 is moved by contact with the test member 60, the lever 32 moves to close an electrical switch within the body. When the stop 33 is no longer in contact with the test member 60 in its inserted position, the lever 32 moves in the opposite direction to open said electrical switch. This electrical switch thus generates a signal representative of the presence or absence of the test member 60 in the inserted position. In particular, the change of state of this signal allows the processing unit to detect the disappearance of the test member 60 from the inserted position, and therefore to know with accuracy the detection time in order to determine the spraying time.

The actuator 40 is for example a motor 41, preferably a step motor, which rotates a motor shaft 42 which drives an arm 43, said arm 43 being in contact with the dispensing device 20 at a distance d from the motor shaft, in order to actuate the dispensing device 20 by pivoting the arm 43.

The processing unit 50 thus comprises a microprocessor with, for example as is well known, digital and analog inputs/outputs, a memory, a clock, etc. The inputs and outputs are connected to the sensor 30 and to the actuator 40. The memory stores code instructions suitable for operating the system, and information.

The system 1 comprises a power supply which provides power to the actuator 40 and processing unit 50. It is possible, as shown in FIG. 3, for this power supply to be formed of a housing 14 containing one or more cells or batteries (rechargeable), eliminating the need to maintain a connection to the power grid.

The system 1 comprises a display device 13 which is used to display:
- a problem in the insertion of the container 22, or conversely a correct insertion of the container 22, so that the user can check for a correct or incorrect supply of perfume, and/or
- a problem in the cell or battery charge level or conversely a good charge level, so that the user can check for a correct or incorrect supply of power.

This display device 13 allows the user to check the power supply conditions of the system which enable it to function properly. This display device 13 may simply be composed of one or more light emitting diodes (LEDs) or possibly a screen if a lot of information is to be displayed. In the case of LEDs, a color code or flashing at different rates or any other type of code can be used to deliver information about the operation of the system 1.

The system 1 comprises a control button 12 connected to the processing unit 50 and making it possible to cause immediate dispensing of perfume onto the test member 60 if the latter is detected by the sensor 30 as being inserted into the housing. The system 1 further comprises an automatic perfume dispensing procedure described below.

In the system for testing a perfume according to the invention, the processing unit 50 receives the signal from the sensor 30 and controls the actuator 40 at a specific moment during extraction of the test member 60 from the housing 10. With this arrangement, the perfume is dispensed onto the test member 60 shortly before the olfactory experience of the user. This experience is thus more controlled and better reproduces the base notes, heart notes, and top notes of the perfume that are smelled, in other words the entire olfactory spectrum of the perfume.

The extraction of the test member 60 from the housing 10 is illustrated in FIGS. 5a to 5d.

Figure 5A:
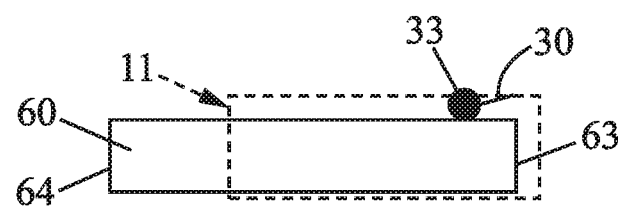
FIGS. 5a to 5d are schematic views showing the successive steps during withdrawal of the test member.

In FIG. 5a, the test member 60 is in the inserted position and the signal from the sensor 30 is in a first state which corresponds to detection of the presence of the test member.

Figure 5B:
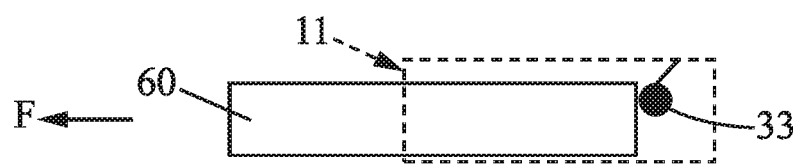

In FIG. 5b, the test member 60 is starting to be withdrawn from the opening 11, as indicated by the arrow F. For example (the case of a mechanical sensor), the stop 33 is released from contact with the test member 60, thereby swinging the lever 32 and causing the signal from the sensor 30 to switch from the first state to a second state that corresponds to detection of the non-presence (absence) of the test member 60 in the inserted position, at a detection time td.

Due to this switching of the signal 30, the processing unit 50 therefore detects the disappearance of the test member 60 from the housing 10, substantially at detection time td.

Figure 5C:
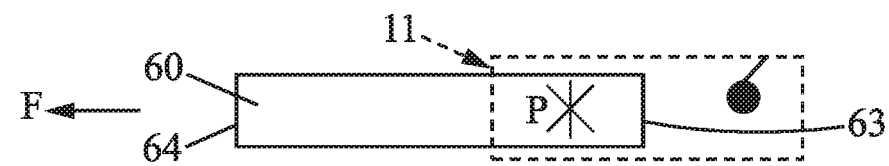

In FIG. 5c, the test member 60 is continuing to be withdrawn from the opening 11. It is in a withdrawn position (between the inserted position and the extracted position). The processing unit 50 controls the actuator 40 during this withdrawal of the test member, shortly after detection time td, so that perfume is dispensed onto the test member 60 at spraying time tp.

In other words, a spraying is generated during withdrawal of the test member from the opening 11, at a spraying time tp, such that:

$$tp=td+dt$$

where
td is the detection time, and
dt is a time delay.

This spraying time tp is the detection time td plus a predetermined time delay dt. This time delay dt combines at least the response time of the processing unit 50 (electronic), the response time of the actuator 40 (motor), and the response time of the dispensing device 20 (pump).

The user of the test member 60 withdraws it from the opening 11 of the housing 10 according to a certain average velocity profile.

The velocity profile for extraction of the test member 60, the time delay dt for the dispensing, and the position in the longitudinal direction X of the pump 21 relative to the sensor 30, all determine the position P of the dispensing of perfume onto the test member 60 at spraying time tp as shown in FIG. 5c. This position P is for example at a distance di from the insertion end 63 of the test member 60.

Figure 5D:
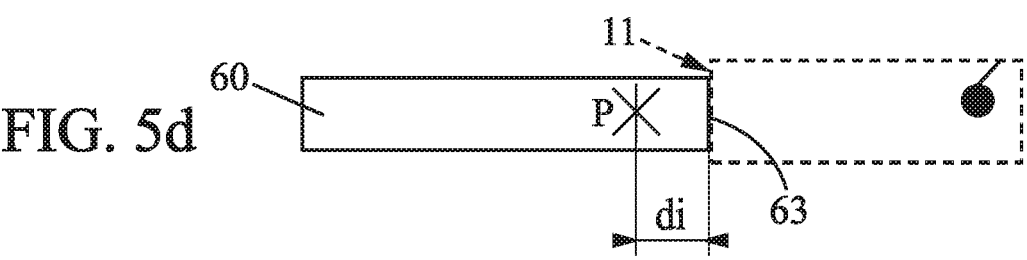

In FIG. 5d, the test member 60 is in the extracted position, completely removed from the housing 10, and the user can evaluate the perfume deposited thereon.

In particular, by using a test member 60 with a hard, porous material, combined with a dispensing during extraction from the housing, in other words at the very last moment, the user of the system can experience the entire olfactory spectrum of the perfume as explained above.

According to a first variant, the processing unit 50 controls the actuator 40 so as to cause the dispensing of perfume onto the test member 60 during withdrawal of the test member 60, only if the last (preceding) spraying time tp' was sufficiently long ago, in other words only if a prevention period di measured between the previous spraying time tp' and the present time t is greater than a first time limit DL1.

In other words, a spray is generated during withdrawal of the test member from the opening 11, at a spraying time tp, such that:

$$tp=td+dt$$

if $di=t-tp'>=DL1$.

This ensures that the period of time between two successive sprays is greater than the first time limit DL1, meaning that:

$$tp-tp'>=DL1.$$

This prevents perfume from being dispensed too frequently onto the test member 60, in other words two times in a row within a short interval that is less than said first time limit DL1. This prevents an excessive amount of perfume from being dispensed onto the test member over a certain period, and thus avoids saturating the test member 60 with a large amount of perfume. It therefore avoids inappropriately modifying the olfactory spectrum of the perfume, meaning the experienced base notes, heart notes, and top notes.

This first time limit DL1 is for example modified by configuring the processing unit, for example by downloading new software for the processing unit.

This first time limit DL1 possibly has a value between 5 minutes and 120 minutes. This prevents the test member 60 from being saturated with perfume, as explained above. This first time limit DL1 is for example 60 minutes.

According to another variant, the processing unit 50 periodically controls the actuator 40 in an automatic or forced manner (without withdrawal or extraction of the test member, in other words in the absence of detecting the disappearance of the test member from its inserted position inside the housing). This prevents the test member 60 from being impregnated with perfume over a very long period, which would also inappropriately modify the olfactory spectrum of the perfume: the experienced base notes, heart notes, and top notes of the perfume. In particular, this procedure of periodic spraying helps to better maintain a minimum amount of perfume on the test member 60, which preserves the entire olfactory spectrum of the perfume, and in particular the heart note.

In particular, the processing unit 50 automatically controls the actuator 40 in the absence of the disappearance of the test member 60, if the presence of the test member 60 is detected inside the housing 10 during a regeneration time dr measured between a previous spraying time tp' and a present time t, said regeneration period being greater than a second time limit DL2.

In other words, a spraying of the test member 60 in the inserted position is generated in an automatic or forced manner, when there is no detection of a withdrawal of said test member, if $dr=t-tp'>=DL2$.

This ensures that the duration between two successive sprays is less than the second time limit DL2, in other words:

$$tp-tp'<=DL2.$$

This second time limit DL2 is for example modifiable by configuring the processing unit, for example by downloading new software for the processing unit.

The second time limit DL2 possibly has a value comprised between 120 minutes and 600 minutes. This prevents the test member 60 from being too weakly impregnated with perfume, as explained above. The second time limit DL2 is for example 180 minutes.

It goes without saying that the processing unit stores at least the time of the previous spraying tp. Any new spraying caused by extraction of the test member 60 or caused automatically by said second time limit DL2, means the value of the previous spraying time tp' is updated with the value of the present time t.

According to another variant, the motor 41 is able to vary the amount of perfume dispensed by the dispensing device 20. In particular, if the dispensing device 20 is a pump 21 of the type used in perfume bottles, this pump 21 is able to spray a predetermined amount of perfume when the head of said dispensing device 20 is fully actuated. For example, the pump is able to dispense a predetermined amount of 100 microliters, said predetermined amount being the maximum amount that said pump can deliver in a single action. Thus, the motor 41 may have an amplitude of action that can be adjusted so that the dispensing device 20 only dispenses a fraction (smaller amount) of the predetermined amount. For example, the motor 41 can be controlled to dispense one quarter (¼), one half (½), three quarters (¾), or the entirety of the predetermined maximum amount. Other more precise fractions may also be possible.

With this adjustment to the control of the actuator motor 41, it is possible to impregnate the test member 60 with an adjustable amount of perfume adapted to each perfume composition. This predetermined amount is, for example, modifiable by configuring the processing unit 50 as above.

According to another variant, the system 1 further comprises a load detection means (not shown) which detects the insertion of a container 22 into a housing 24 of the system, when the system is first started up or when changing the container 22 when it is empty or close to empty. The system 1 may possibly use the display device 13 to inform the user of correct or incorrect insertion of the container 22.

After detecting the insertion of the container 22 into the housing 24, the system controls the actuator 40 one or more times in order to prime the dispensing device 20. The processing unit 50 thus successively controls a plurality of sprays of perfume, preferably at the predetermined maximum amount of the pump. This succession of sprays is carried out at a rate compatible with the performance of the pump. The priming fills the perfume dispensing circuit, meaning the dip tube 23, the pump 21, and any other member of said circuit. After priming, the system 1 is ready for immediate operation.

According to another variant, the system further comprises a priming button connected to the processing unit 50 in order to trigger the actuator one or more times and thus force a priming of the dispenser 20. The priming button is possibly the same button as the control button 12, the two functions being distinguishable to the control unit by the timing of the button signal. Thus, a long press or multiple presses will trigger the priming function, and a single press of short duration will trigger a simple dispensing of perfume.

According to another variant, the system 1 may possibly comprise a fill level detection means 22 for the container or may estimate the fill level. In this case, the processing unit 50 for example counts each actuation of the actuator 40 and/or each fraction of the predetermined amount in order to estimate the fill level. The system 1 may possibly use the display device 13 to inform the user of the fill level of the container 22.

According to another variant, the system 1 comprises an absorbent pad 16 arranged within the housing and close to the opening 11 and in a position for wiping at least a portion of the test member 60 during its extraction. This prevents any surplus on the test member. The absorbent pad 16 is for example a cylinder composed of absorbent fibers such as cotton. The absorbent pad 16 is for example located in a lower portion of the opening 11 in order to collect the perfume which flows downward. The absorbent pad 16 may also be located in a lateral position of the opening, in particular on the side from which the dispensing device 20 sprays perfume onto the test member 60, in order to collect any excess. It is possible for the absorbent pad 16 to be positioned over the entire periphery of the opening. One may note that this absorbent pad also contributes to the sensation of quality during insertion and withdrawal of the test member 60 into and from the housing 10, because it diminishes the sliding noises.

According to another variant, the system 1 comprises a housing 10 comprising a plurality of openings 11, or a plurality of housings 10 each housing comprising an opening 11. In such a system, each opening 11 is able to receive a test member 60.

The openings 11 are supplied from the same container (one perfume) or from different containers (multiple perfumes that may be the same or different).

Preferably, the test members 60 and the openings 11 are identified so that each test member is only inserted into the associated opening in such a way that a particular test member is only impregnated with a single perfume, and according to a controlled history of spraying times stored by the one or more processing unit(s) 50.

The test members 60 and the openings 11 have appropriate shapes so that a test member 60 can only be fully inserted (until its detection by the sensor) into one opening 11, to avoid errors. Thus, a test member inserted into the wrong opening (not associated) cannot be impregnated with the perfume of that opening. Suitable shapes for the test member 60 either have the shape of a coded key in their cross-section transverse to the longitudinal direction X or in the longitudinal direction X.

In the case where a plurality of housings 10 is used, these housings are advantageously identical. If necessary, a single power supply supplies the various housings via power connectors 15 (visible in FIG. 3) located on the back of each housing 10 and allowing the power supplies of the housings 10 to be chained.

The invention claimed is:

1. A system for testing a perfume, comprising:
a housing comprising an opening,
a test member able to be at least partially inserted into the housing through the opening, the test member being at least partially made of a material able to be impregnated with perfume,
a dispensing device arranged inside the housing and able to dispense the perfume onto the test member, said dispensing device being connected to a container containing the perfume,
a sensor which provides a signal suitable for detecting the presence or non-presence of the test member in the housing,
an actuator arranged inside the housing and able to actuate the dispensing device, and
a processing unit which receives the signal from the sensor and which controls the actuator to cause perfume to be dispensed onto the test member, said system being characterized in that:
the material of the test member is hard and porous, and
the processing unit controls the actuator at a spraying time determined relative to a detection time corresponding to the detection of the disappearance of the test member, for determining a position of the dispensing of perfume onto the test member during withdrawal of the test member.

2. The system according to claim 1, wherein the processing unit controls the actuator to cause said dispensing of perfume onto the test member, only if a prevention period measured between a previous spraying time and a present time exceeds a first time limit, in order to avoid saturating the test member with a large amount of perfume.

3. The system according to claim 2, wherein the first time limit is equal to 60 minutes.

4. The system according to claim 1, wherein the processing unit automatically controls the actuator in the absence of detecting the disappearance of the test member, if the presence of the test member is detected in the housing during a regeneration period measured between a previous spraying time and a present time, said regeneration period being greater than a second limit time, in order to maintain a minimum amount of perfume on the test member.

5. The system according to claim 4, wherein the second limit time is 180 minutes.

6. The system according to claim 1, further comprising a priming button, and the processing unit controls the actuator one or more times in order to prime the dispensing device upon detecting the actuation of said priming button by a user.

7. The system according to claim 1, wherein the actuator comprises a controllable motor suitable for varying the amount of perfume dispensed by the dispensing device onto the test member.

8. The system according to claim 1, further comprising an absorbent pad arranged inside the housing and close to the opening, said absorbent pad being suitable for wiping at least a portion of the test member during extraction of said test member.

9. The system according to claim 8, wherein the absorbent pad is positioned in a lower portion of the opening.

10. The system according to claim 1, wherein the test member has, in a longitudinal direction, a first portion suitable for being impregnated with perfume and a second portion suitable for manipulating said test member, and wherein the first portion has a predetermined length such that, when the test member is in an inserted position where the sensor detects the presence of the test member, the first portion does not protrude outside the housing.

* * * * *